United States Patent [19]
Guzman-Edery et al.

[11] Patent Number: 4,724,534
[45] Date of Patent: Feb. 9, 1988

[54] METHOD AND APPARATUS FOR TRANSMITTING BINARY DATA SIGNALS BY FREQUENCY SHIFT KEYING

[75] Inventors: Jorge Guzman-Edery; Wolfgang Steiger, both of Lampertheim, Fed. Rep. of Germany

[73] Assignee: BBC Aktiengesellschaft, Brown, Boverie & Cie, Baden, Switzerland.

[21] Appl. No.: 882,496

[22] Filed: Jul. 7, 1986

[30] Foreign Application Priority Data

Jul. 13, 1985 [DE] Fed. Rep. of Germany ....... 3525125

[51] Int. Cl.⁴ .......................................... H04L 27/12
[52] U.S. Cl. ..................................... 375/62; 332/16 R
[58] Field of Search ........................... 375/62, 64, 65; 332/9 R, 10, 16 R; 364/721; 328/14

[56] References Cited

U.S. PATENT DOCUMENTS

| | | | |
|---|---|---|---|
| 4,003,001 | 1/1977 | Jones, Jr. ............... | 332/16 R |
| 4,227,248 | 10/1980 | Munter ................. | 364/721 |
| 4,410,955 | 10/1983 | Burke et al. ............ | 364/721 |
| 4,613,976 | 9/1986 | Sewerinson et al. ...... | 332/16 R |

*Primary Examiner*—Benedict V. Safourek
*Attorney, Agent, or Firm*—Herbert L. Lerner; Laurence A. Greenberg

[57] ABSTRACT

A modulator for modulating binary data signals by frequency shift keying (FSK), in which a binary data level 1 is represented by a first frequency ($f_1$) and the binary data level 0 is represented by a second frequency ($f_2$) is provided. The modulator addresses a first addressing input of a programmable memory with the binary data signals, in which half the periods of the two frequencies ($f_1$, $f_2$) are marked in two memory regions (I, II) of the programmable memory addressed by the first addressing input. The modulator further controls other address inputs with a driven counter; and generates a pulse resetting the counter and controlling a 2:1 frequency divider having an output delivering one of the frequencies ($f_1$, $f_2$), when addressing a storage cell, in which one of the halfperiods is marked.

7 Claims, 5 Drawing Figures

Fig. 3a — 1 BINARY
— 0 DATA

Fig. 3b — OUTPUT SIGNAL $f_1$    $f_2$

METHOD AND APPARATUS FOR TRANSMITTING BINARY DATA SIGNALS BY FREQUENCY SHIFT KEYING

The invention relates to a method for transmitting binary data signals by frequency shift keying (FSK), in which a binary data signal 1 is represented by a first frequency ($f_1$) and a binary data signal 0 is represented by a second frequency ($f_2$), as well as an apparatus for carrying out the method.

Methods for transmitting binary data signals by frequency shift keying are generally also known under the designation "FSK" (frequency shift keying). These methods are counted among frequency modulation methods where only two assigned frequencies must be generated in an FSK modulator for representing the binary states 1 and 0 of the signals to be transmitted. These assigned frequencies are understood to be shift frequencies generated by changing a carrier frequency $f_T$ by a frequency excursion $f_h$. In the CCITT Recommendations V.1, it is stated that the binary 1 corresponds to the lower frequency $f_1 = f_T - f_h$ and the binary 0 corresponds to the higher frequency $f_2 = F_T + f_h$. The occupied frequency range $F_T \pm f_h$ represents a transmission channel. The widths of the channels depend on the transmission speed (Baud rate) and the number of channels available within, such as a total band width of 300 to 3400 Hz in a-c telegraphy. FSK modulators must be adjustable to the assigned characteristic frequencies $f_1$ and $f_2$ and should be readjustable to different channels. Such FSK modulators have already been constructed in various ways, for instance with PLL components, RC oscillators, analog modulators (active and passive) sine generators and frequency synthesizers (dividers, mixers). In the journal "Electronics", June 5, 1982, Page 161, a PLL circuit constructed as an integrated component is described which can be used as an FSK modulator or demodulator. In order to fix the working frequencies, a component is externally connected with capacitors and resistors.

Disadvantages of the prior art FSK modulators are that the accuracy of the frequencies depend on passive components and thus on influences due to aging and environmental conditions such as temperature and humidity. In order to change frequencies, it is necessary to exchange components. The costs of the circuits are relatively high.

It is accordingly an object of the invention to provide a method and apparatus for transmitting binary data signals by frequency shift keying which overcomes the hereinafore-mentioned disadvantages of the heretofore-known methods and devices of this general type.

With the foregoing and other objects in view there is provided, in accordance with the invention, a method for transmitting binary data signals by frequency shift keying (FSK), in which a binary data signal 1 is represented by a first frequency ($f_1$) and a binary data signal 0 is represented by a second frequency ($f_2$), which comprises:

addressing a first addressing input of a programmable memory with the binary data signals, in which half the periods of the two frequencies ($f_1$, $f_2$) are marked in two memory regions (I, II) of the programmable memory addressed by the first addressing input;

controlling other address inputs with a free-running counter; and generating a pulse resetting the counter and controlling a 1:2 frequency divider having an output delivering one of the frequencies ($f_1$, $f_2$), when addressing a storage cell in which one of the half periods is marked.

In accordance with another mode of the invention, there is provided a method, which comprises controlling the address input for the most significant bit with the binary data for subdividing the memory into two regions (I, II) in which one of the half periods is marked.

In order to carry out the method, there is provided an FSK (frequency shift keying) modulator for transmitting binary data signals, in which a binary data signal 1 is represented by a first frequency ($f_1$) and a binary data signal 0 is represented by a second frequency ($f_2$), comprising a modulator input for the binary data signals; a programmable memory having a first address input connected to the modulator input for the binary data signals, further address inputs, a data output, a first memory region (I) with at least one storage cell containing a marking of a half period of the first frequency ($f_1$), and a second memory region (II) with at least one storage cell containing a marking of a half period of the second frequency ($f_2$); a clock generator having an output; a counter having an input connected to the output of the clock generators, outputs connected to the further address inputs of the programmable memory, and a resetting input: a first D-flip-flop stage having a data input connected to the data output of the programmable memory, a clock input connected to the output of the clock generator, and an output connected to the resetting input of the counter; a second D-flip-flop stage operated as a 1:2 frequency divider having an input connected to the output of the first D-flip-flop stage and to the resetting input of the counter, and an output; and a modulator output connected to the output of the second D-flip-flop stage.

In accordance with an added feature of the invention, the half period is marked by storing a 1 while the other memory cells contain a 0.

In accordance with a further feature of the invention, the first address input of the programmable memory is the most significant address input.

In accordance with yet another feature of the invention, the clock generator is quartz-controlled.

In accordance with a concomitant feature of the invention, the programmable memory is byte oriented, the data output of the programmable memory includes a plurality of outputs, and including a device for selecting one of the plurality of outputs to be fed to the data input of the first D-flip-flop stage.

Among others, the advantages of the method according to the invention are that the characteristic frequencies $f_1$ and $f_2$ can be fixed by programming a memory and, according to a further advantageous embodiment, a change of channels can take place by simply switching to another column of the memory which is structured in rows and columns. The FSK modulator for carrying out the method according to the invention is characterized by a simple construction and high frequency stability.

Other features which are considered as characteristic for the invention are set forth in the appended claims.

Although the invention is illustrated and described herein as embodied in a method and apparatus for transmitting binary data signals by frequency shift keying, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 3a is a graph showing binary data at an input E of the FSK modulator; and

FIG. 3b is a graph showing a frequency modulated signal at an output A of the FSK modulator.

Figure 1:
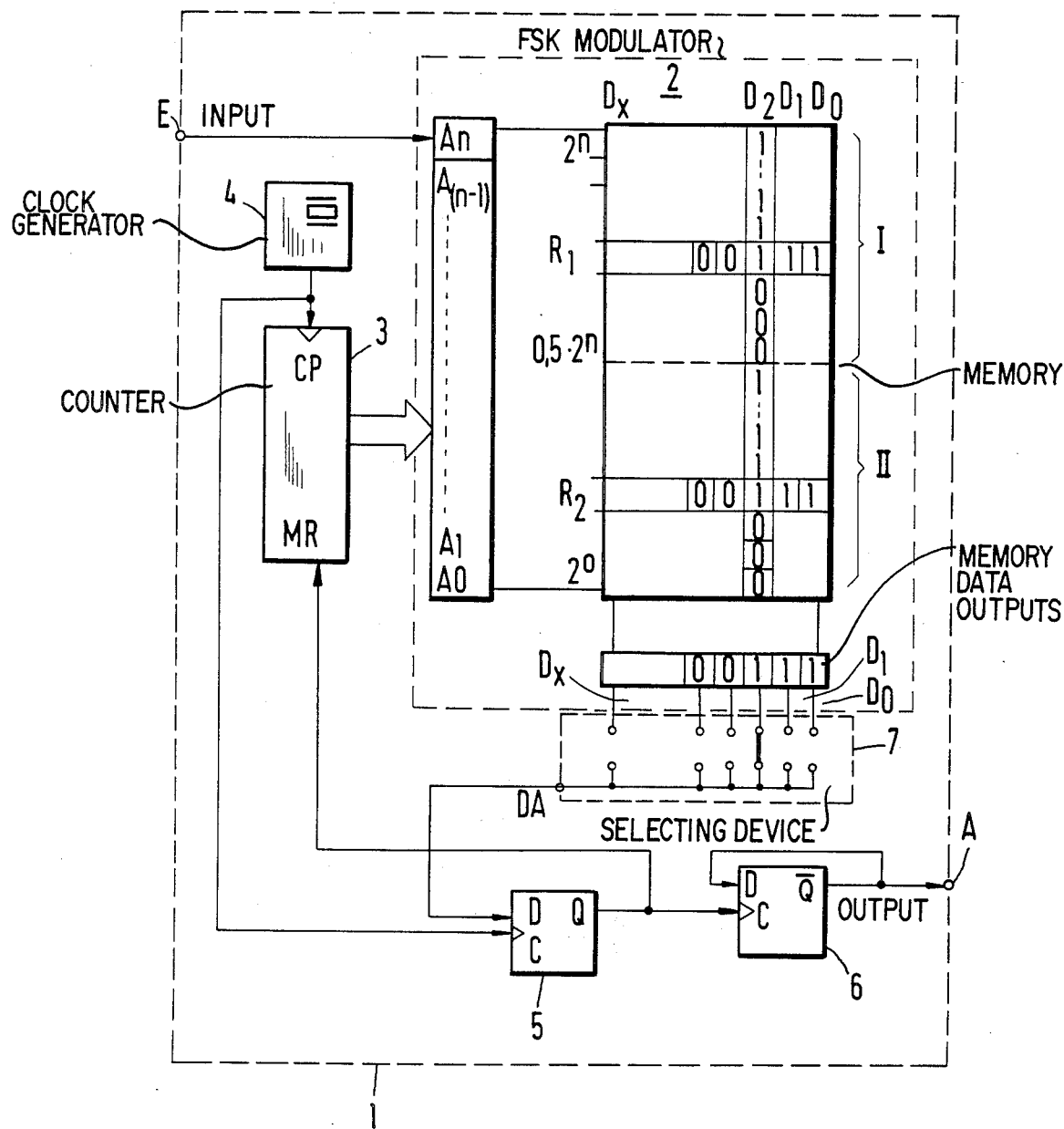
FIG. 1 is a block circuit diagram of an FSK modulator according to the invention.

Referring now to the figures of the drawings in detail and first, particularly, to FIG. 1 thereof, there is seen the construction of an FSK modulator 1 according to the invention. The modulator 1 contains a byte-oriented programmable memory 2, a counter 3, a clock generator 4, a first flip-flop stage 5 and a D-flip-flop stage 6.

The output of the quartz-controlled clock generator 4 is fed to a counting input CP of the counter 3. Outputs of the counter 3 which represent the current counter reading, are connected to addressing inputs $A_1$ to $A_{n-1}$ of the memory 2. In the illustrated embodiment, a byte-oriented PROM is involved, but other programmable memories are suitable. If the possibility for switching to other channels is dispensed with, a bit-organized programmable memory can also be used.

The memory 2 includes $2^n$ rows and x columns, in the customary manner. The rows are addressed by the address inputs $A_O$ to $A_n$ and the data byte stored in the addressed row is fed to data outputs $D_O$ to $D_x$. The data outputs $D_O$ to $D_x$ of the memory 2 are fed to a selecting device 7 for selecting one of the outputs $D_O$ to $D_x$. In the device 7, soldering pins may be provided into which a jumper is soldered as shown in the drawing, or a double-throw switch for selecting one of the columns $D_O$ to $D_x$ corresponding to the outputs DO to $D_x$.

An output DA of the selector device 7 is connected to a data input D of the first flip-flop stage 5. A data input C of this flip-flop stage 5 is connected to the output of the clock generator 4. The output Q of the first flip-flop stage 5 is fed to a resetting input MR of the counter 3 in addition to a clock input C of the D-flip-flop stage 6. The output $\overline{Q}$ of the second flip-flop stage 6 is fed back to its data input D and additionally forms an output A of the FSK modulator 1. An input E of the FSK modulator 1 is fed to an address input $A_n$ of the memory 2.

The operation of the FSK modulator 1 previously described with respect to the construction thereof, will be explained below.

The FSK modulator 1 serves the purpose of converting binary data which are entered as a sequence of individual 0 signals at the input E of the FSK modulator 1, into frequencies $f_1$ and $f_2$ which are to be read out at the output A. In the memory 2, half the periods of the frequencies $f_1$ and $f_2$ are programmed and specifically, the half of the lower frequency $f_1$ which includes the longer half period $T_1$ in an upper memory region I, which includes the upper half of the addresses, and the shorter half period $T_2$ in a lower memory region II which includes the addresses in the lower region, beginning at $2^0$. The half periods $T_1$ and $T_2$ are stored for several channels by programming in the columns $D_O$ to $D_x$. Periods $T_1$ and $T_2$ belonging to a channel are programmed in a column. Only one of the columns $D_O$ to $D_x$ is selected by means of the selector device 7. Only one of the data bytes stored in a row, is therefore utilized.

The memory is addressed by the counter 3 and the data coming from the input E. Since the data addresses the most significant address input $A_n$, they determine whether a row in the lower memory region II or in the upper memory region I is addressed.

Figure 2A:
FIG. 2a is a graph showing pulses at the clock input of a second D-flip-flop stage in the FSK modulator.
Figure 2B:
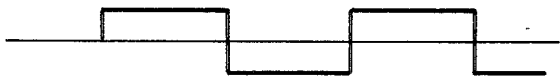
FIG. 2b is a graph showing pulses at the output of a second D-flip-flop stage.

The counter 3 counts forward at the frequency of the clock generator 4, starting at 0. Every counting step represents an address for addressing a row of a memory 2. If it is assumed that the data line coming from the input E furnishes a 0, addresses in the lower memory region II are addressed by the counter 3 and the memory content of the addressed row is fed to the output. The content of the storage cell of the chosen column, which is the column $D_2$ in the illustrated embodiment, travels to the data input D of the first flip-flop stage 5. The memory cells of the lower rows of the lower memory region II contain a 0 which is passed on by the first flip-flop stage 5. If a counter reading and therefore, a PROM address is reached which corresponds to a row $R_2$ in which a 1 is stored in the column $D_2$, the 1 is fed to the data input D of the first flip-flop stage 5. The first flip-flop stage 5 is synchronized with the counter 3 by the clock generator 4. A 1 appears at the output Q of the first flip-flop stage 5, which resets the counter 3 and is furthermore brought to the D-flip-flop stage 6. The D-flip-flop stage 6 halves the frequency to the desired value $f_2$. The feedback of the output to the data input D of the second flip-flop stage 6 has the effect of changing the polarity of the output with each second pulse at the input. The pulses at the data input D of the second flip-flop stage 6 are shown in FIG. 2a. FIG. 2b shows the pulses at the output $\overline{Q}$ of the second flip-flop stage 6. From these figures it can be seen that the D-flip-flop stage 6 acts as a 2:1 frequency divider.

Since the counter 3 has been reset, it starts to count again at 0 until a counter reading is again reached which corresponds to the row $R_2$, so that the next pulse at the input of the Dflip-flop stage 6 is generated as is shown in FIG. 2a.

If the binary state of the data at the input E changes to a 1, the addresses shown by the counter reading and the data state correspond to the row addresses in the upper memory region I. The counter reading 0 then no longer corresponds to the address of the first row in the lower memory region II but to the lowest row in the memory region I. Otherwise, the same process continues as was described before. While being controlled by the counter 3, the content of the column $D_2$ is sequentially taken to the first flip-flop stage 5 until a row $R_1$ is reached which contains a 1 in the cell of the column $D_2$, so that the period $T_1$ is marked and the counter 3 is reset. The distance between the row $R_1$ and the output row $0.5 \times 2^n$ is larger than the distance between the row $R_2$ and the output row 0, i.e. more rows are inbetween. This means that the period $T_1$ is longer than the period $T_2$.

As a result, a sequence of frequencies $f_1$ or $f_2$ equivalent to the sequence of binary data according to FIG. 3a is generated according to FIG. 3b. FIG. 3b shows a square wave signal at the output A of the FSK modulator. This signal can be converted by filters connected thereto into a sine shape in a conventional manner.

During normal operation, the counter 3 can only count up so far each time that the address of the row $R_1$ or $R_2$ is reached. However, it is also possible for a data jump from 1 to 0 to occur at an instant at which a row shortly before the row $R_1$ is addressed in the memory region I, whereupon the memory addressing jumps into the lower memory region II. The memory row then addressed could lie above the row $R_2$. If a 0 were stored in the cells of the column $D_2$ above the row $R_2$, the counter 3 would continue to count on and on until the row $R_2$ was reached again after an overflow. In order to prevent such a behavior of the counter 3, the value 1 is programmed into the cells of the column Dhd 2 located above the row $R_2$, (and correspondingly in the other columns). It is advisable to also program a 1 in rows above the row $R_1$ in the memory region I. In this way a resetting pulse is released in any case for every clock pulse after one of the rows $R_1$ or $R_2$ is exceeded.

It is advisable to control the most significant addresss input $A_n$ with the binary data as was described above. However, it would also be possible to address one of the other address inputs $A_1$ to $A_{(n-1)}$ with the binary data. The markings for the half periods for the frequencies $f_1$ and $f_2$ would then have to be provided in the memory sectors selected thereby.

We claim:

1. Method for transmitting binary data signals by frequency shift keying (FSK), in which a binary data signal 1 is represented by a first frequency ($f_1$) and a binary data signal 0 is represented by a second frequency ($f_2$), which comprises:
    addressing a programmable memory having first and other address inputs at the first addressing input of the programmable memory with the binary data signals, in which the duration of half the periods of the two frequencies ($f_1$, $f_2$) are marked in two memory regions (I, II) of the programmable memory addressed by the first addressing input;
    controlling the other address inputs with a clock-driven counter; and
    generating a pulse resetting the counter and controlling a 2:1 frequency divider providing an output delivering one of the frequencies ($f_1$, $f_2$), when the counter addresses a storage cell containing a mark by which the duration of one of the half-periods is marked.

2. Method according to claim 1, which comprises selecting by the most significant bit of the binary input data the memory region (I, II) in which the duration of one of the half periods is marked.

3. FSK (frequency shift keying) modulator for transmitting binary data signals, in which a binary data signal 1 is represented by a first frequency ($f_1$) and a binary data signal 0 is represented by a second frequency ($f_2$), comprising a modulator input for the binary data signals; a programmable memory having a first address input connected to said modulator input for the binary data signals, further address inputs, a data output, a first memory region (I) with at least one storage cell containing a marking of the duration of a half period of the first frequency ($f_1$), and a second memory region (II) with at least one storage cell containing a marking of the duration of a half period of the second frequency ($f_2$); a clock generator having an output; a counter having an input connected to said output of said clock generator, outputs connected to said further address inputs of said programmable memory, and a resetting input; a first flip-flop stage having a data input connected to said data output of said programmable memory, a clock input connected to said output of said clock generator, and an output connected to said resetting input of said counter; a D-flip-flop stage operated as a 2:1 frequency divider having an input connected to its own output and another input to the output of said first flip-flop; and a modulator output connected to said output of said D-flip-flop stage.

4. FSK modulator according to claim 3, wherein the duration of the half period is marked by storing a 1 while the other memory cells contain a 0.

5. FSK modulator according to claim 3, wherein said first address input of said programmable memory is the most significant address input.

6. FSK modulator according to claim 3, wherein said clock generator is quartz-controlled.

7. FSK modulator according to claim 3, wherein said programmabble memory is byte-oriented, said data output of said programmable memory includes a plurality of outputs, and including a device for selecting one of said plurality of outputs to be fed to said data input of said first flip-flop stage.

* * * * *